June 20, 1967  W. JAMAR, JR  3,326,505
DISPLAY AND DIVIDER PANEL STAND
Filed Feb. 19, 1965  8 Sheets-Sheet 4
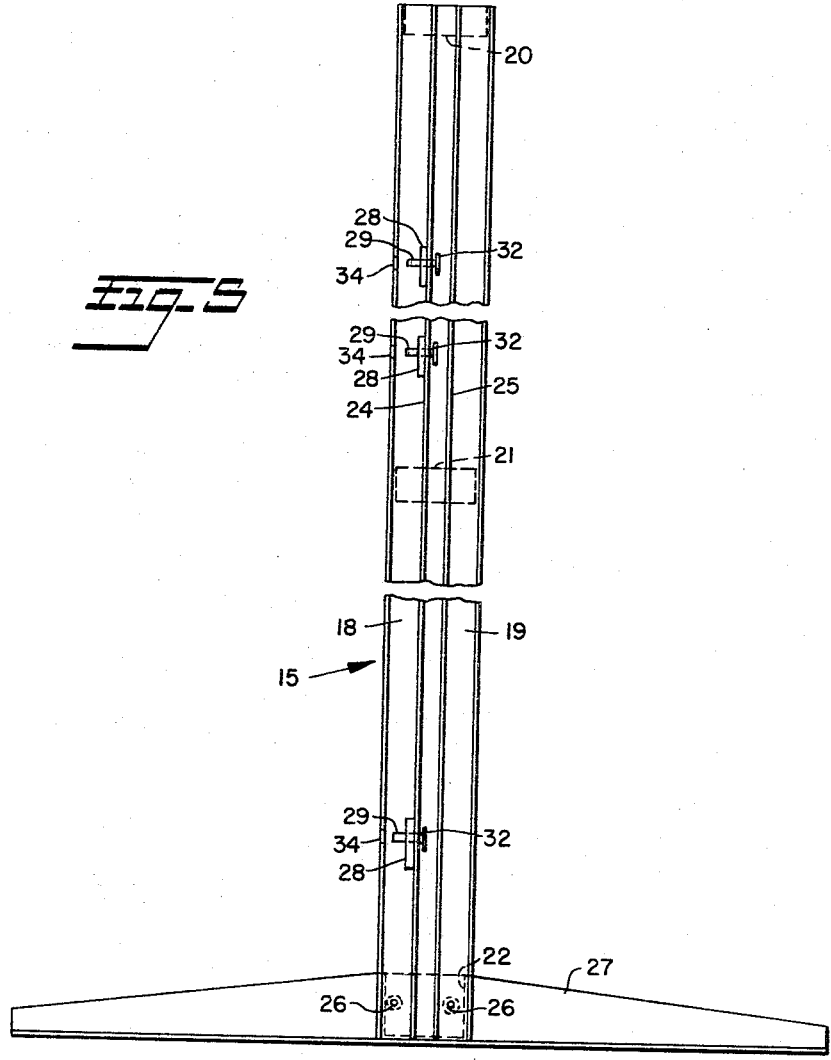
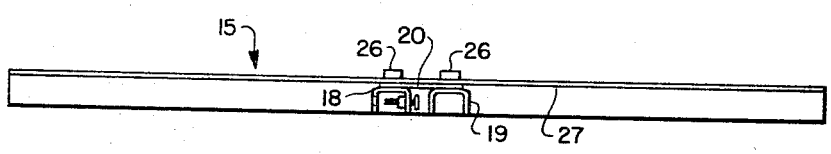
INVENTOR
WALKER JAMAR, JR.
BY Strauch, Nolan & Neale
ATTORNEYS June 20, 1967 W. JAMAR, JR 3,326,505
DISPLAY AND DIVIDER PANEL STAND
Filed Feb. 19, 1965 8 Sheets-Sheet 5
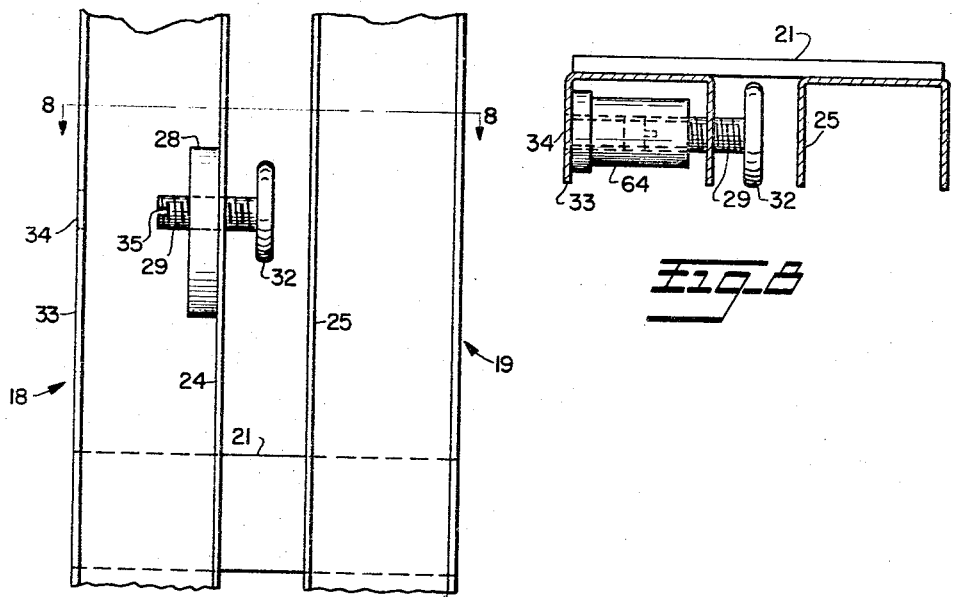
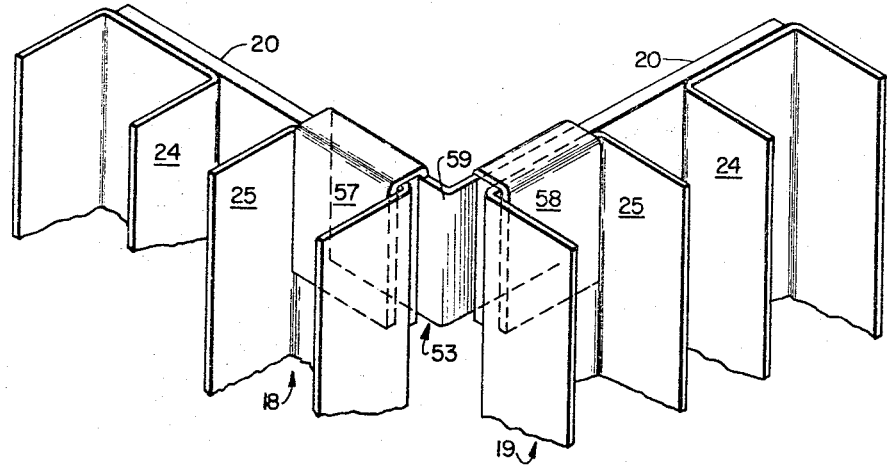
INVENTOR
WALKER JAMAR, JR.
BY
ATTORNEYS

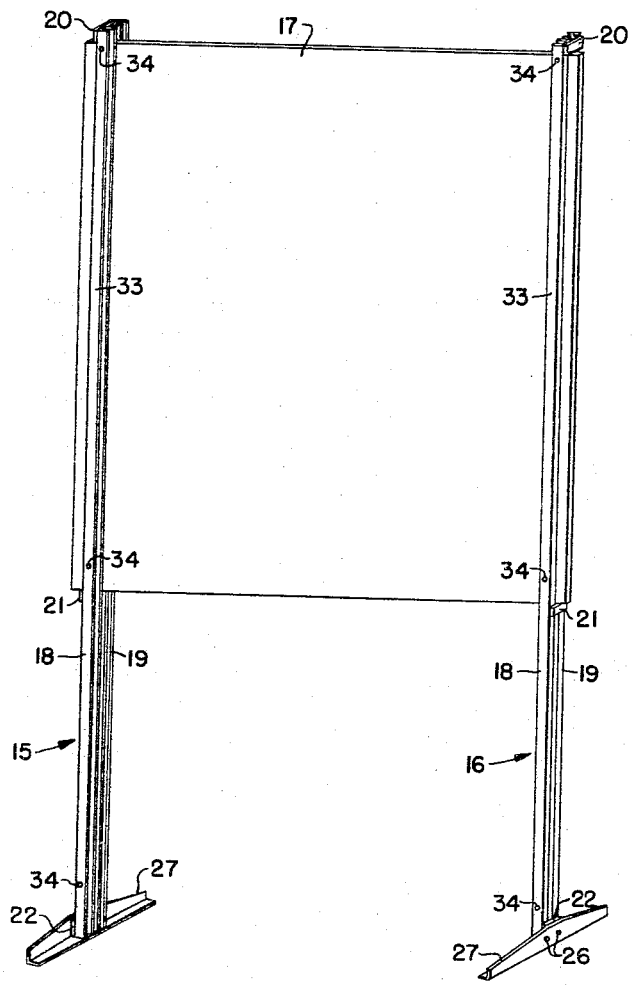

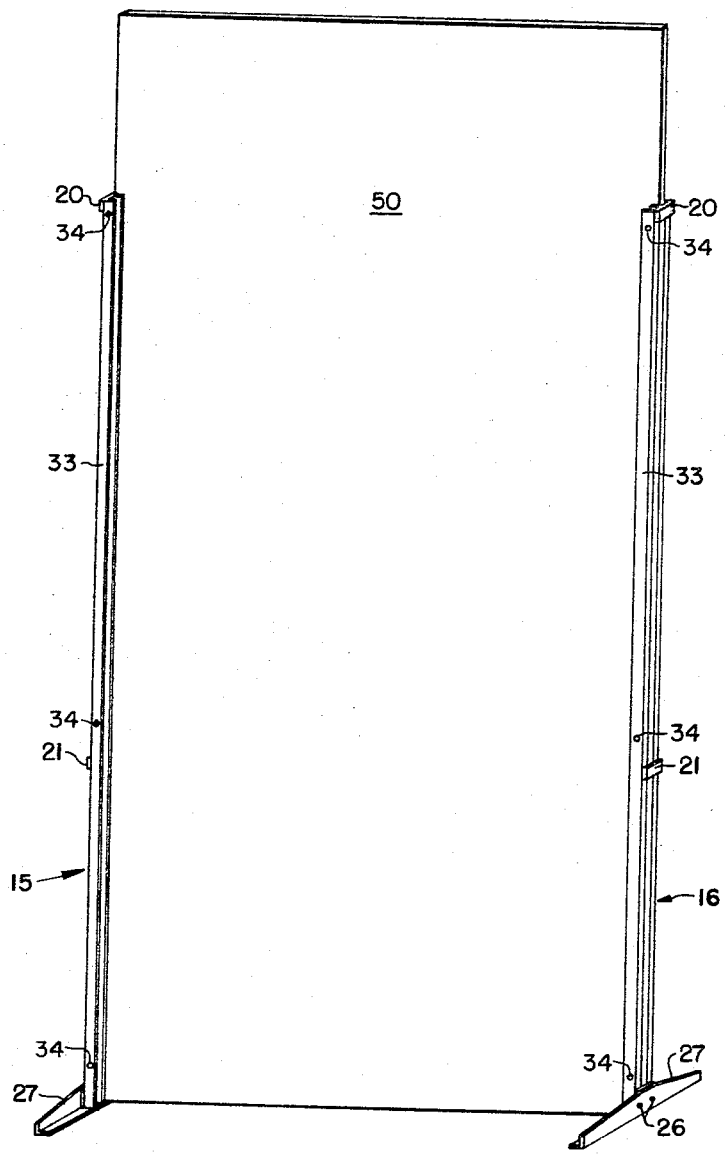

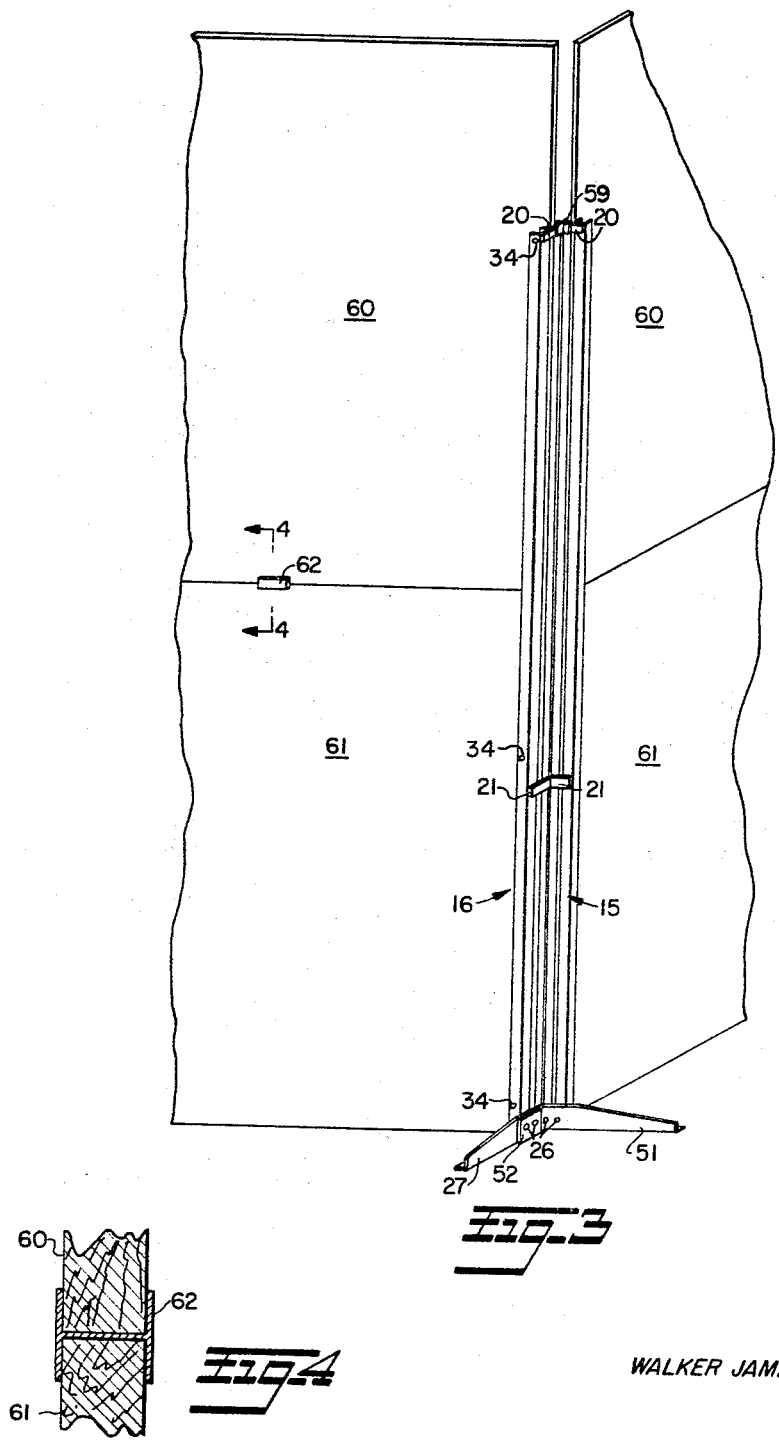

INVENTOR
WALKER JAMAR, JR.

BY

ATTORNEYS

June 20, 1967  W. JAMAR, JR  3,326,505
DISPLAY AND DIVIDER PANEL STAND
Filed Feb. 19, 1965  8 Sheets-Sheet 7
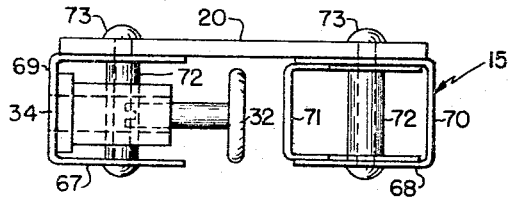
Fig.12
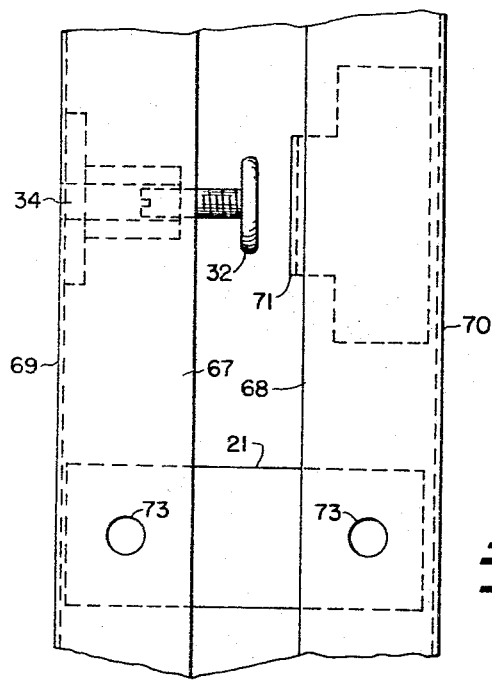
Fig.13
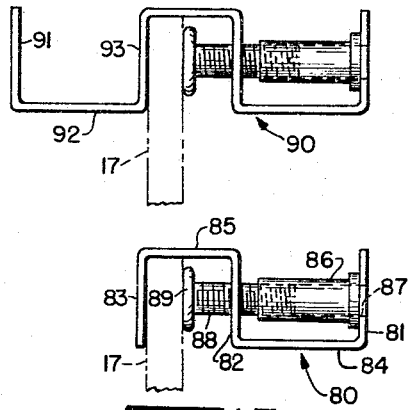
Fig.15
Fig.16
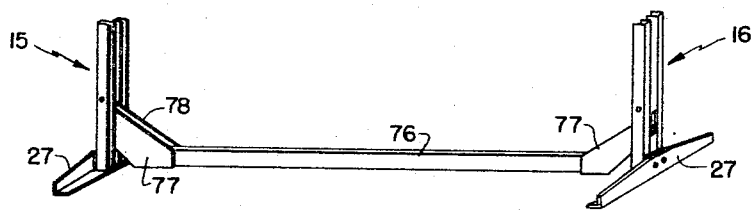
Fig.14
INVENTOR
WALKER JAMAR, JR.
BY
Strauch, Nolan & Neale
ATTORNEYS

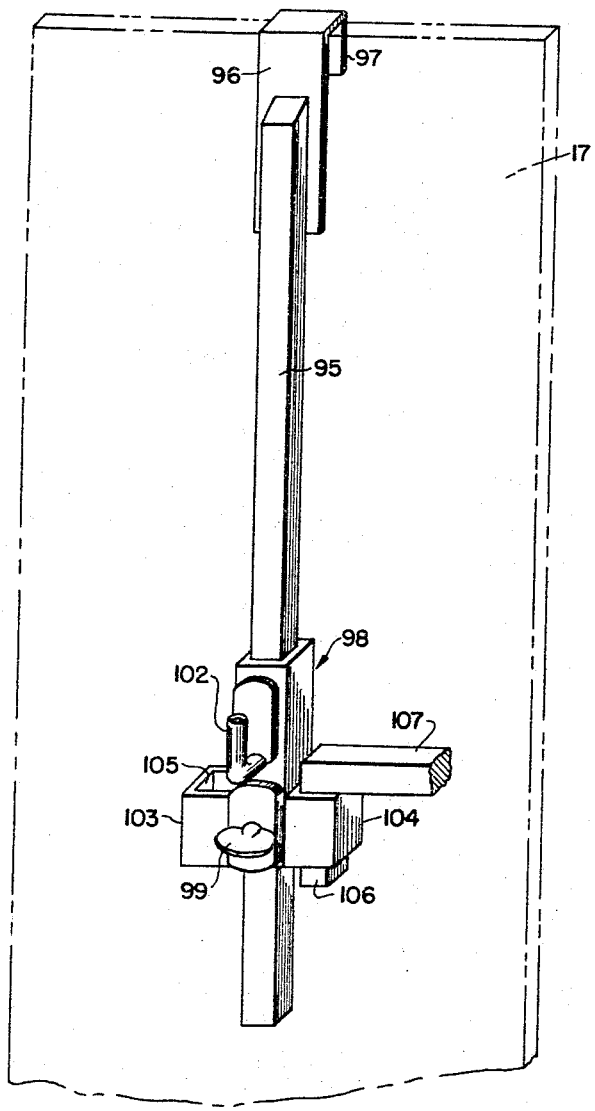
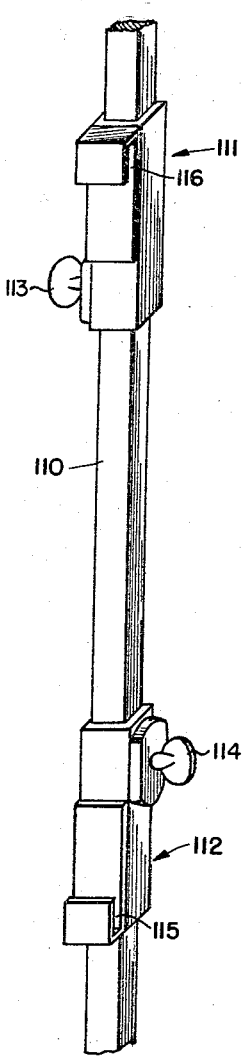

United States Patent Office 3,326,505
Patented June 20, 1967

3,326,505
DISPLAY AND DIVIDER PANEL STAND
Walker Jamar, Jr., 2008 Lakeview Drive,
Duluth, Minn. 55803
Filed Feb. 19, 1965, Ser. No. 433,984
14 Claims. (Cl. 248—125)

ABSTRACT OF THE DISCLOSURE

A structure comprising a pair or more of vertical supports or standards having channels wherein are received the vertical edge portions of sheets of rigid panel members which are securely clamped within the channels to provide portable display panels, wall dividers or the like which are easily and quickly assembled and disassembled. Horizontal legs secured to the bottoms of the standards hold the assembly in an upright position.

---

This invention relates to stands or supports for panels for supporting displays, providing room dividers and the like.

Temporary displays of art, advertisements, merchandise for sale and the like, normally require the use of suitable supports which while being rugged enough for their intended purpose are desirably of lightweight construction to facilitate erection, shifting, dismantling and storage.

The construction of wooden supports for such displays is time consuming and expensive, and when dismantled they are not normally reusable because of breakage or other damage that occurs during dismantling, or present a serious storage and transportation problem.

In accordance with my invention a metallic support is provided for vertical sheets of rigid paneling material such as plywood or the like. The supports are identical in construction and are used in pairs or threes, or multiples thereof, and are particularly designed so as to support single sheets of standard size panel sheets of up to one half inch thick plywood, chipboard, pegboard or wallboard that normally comes in 4 x 8 or 4 x 10 foot sheets. The panel sheets of rigid material are gripped at spaced points on their vertical edges, which is sufficient to hold them flat. The supports provide for the overlapping and clamping of adjacent panels by a single support when the display is to be longer than the width of a single panel. Thus three supports may be used to hold two panels, the central support holding the adjoining edges of two panels and the outer supports holding the outer edges of the panels.

The supports are readily connected at right angles or any other angle so that a pair of adjoining panels will meet at an angle instead of being coplanar.

One of the advantages of the supports and the incidental accessories which comprise the system is that standard sized sheets of plywood or the like may be obtained locally and incorporated with the supports to make a display panel or room divider without any further drilling, sawing, notching, or the permanent fastening of hooks or other fixtures to the plywood. Not only does this result in a saving in initial shipping and fabricating costs to the consumer or user, but the absence of holes, notches, or permanently attached hooks or clamps makes the panels reusable in a variety of arrangements different from the original use and permits their easy transportation and storage. The interchangeability of plywood panels with chipboard panels, pegboard panels, wallboard panels, or any of a variety of other panel finishes in a single support lends added versatility and utility to the use which can be made of a single pair of supports or accessories. The supports not only accommodate standard sized panels of, say 4' x 8' or 4' x 10', but also accommodate shorter lengths for bulletin board use, and will accommodate two panels, one on top of the other, to make a panel or room divider reaching from the floor to a practical maximum height of 8 feet. In the illustrated embodiments only a screwdriver is needed to release the panel from the support or to assemble them therewith. All accessories are designed to be attached to panels by the use of only a screwdriver or, where multiple arrangements of panels are to be fastened together at a single support such as shown in FIGURE 3, the use of a standard box wrench.

It is accordingly a primary object of my invention to provide a novel support for display or wall divider panels and the like, which is adapted to be readily assembled into a combination with a wall panel of standard commercial size to provide a vertical easel for hanging advertising or artistic displays or for merely providing a room divider or the like.

It is another important object of my invention to provide a novel combination of panel and support members which may be easily assembled to form a portable wall or easel.

Still another important object of my invention is the provision of a novel support for vertical panel members which is adaptable to support such panel members singly or in multiple, either in coplanar or angular relationship.

Other objects will become apparent as the description proceeds in connection with the accompanying drawings, wherein:

FIGURE 1 is a perspective view of an embodiment of the invention;

FIGURE 2 is a perspective view of another embodiment of the invention;

FIGURE 3 is a perspective view of still another embodiment of the invention, wherein two panels are shown meeting substantially at right angles;

FIGURE 4 is a sectional view along the line 4—4 of FIGURE 3;

FIGURE 5 is a view in side elevation of one embodiment of panel support;

FIGURE 6 is a top plan view of the support of FIGURE 5;

FIGURE 7 is an enlarged view of a portion of FIGURE 5;

FIGURE 8 is a sectional view substantially along line 8—8 of FIGURE 7, but showing another embodiment of clamping screw;

FIGURE 9 is a perspective view of a juncture at right angles of the upper end portions of a pair of supports;

FIGURES 12 and 13 are sectional and elevation views of a modified structure of one of the supports;

FIGURE 14 is a view showing a structure rigidly connecting two supports;

FIGURES 15 and 16 are sectional views of two forms of longitudinal stiffeners for the boards mounted between supports;

FIGURE 17 is a perspective view of a hanger; and

FIGURE 18 is a perspective view of another form of hanger.

Figure 10:
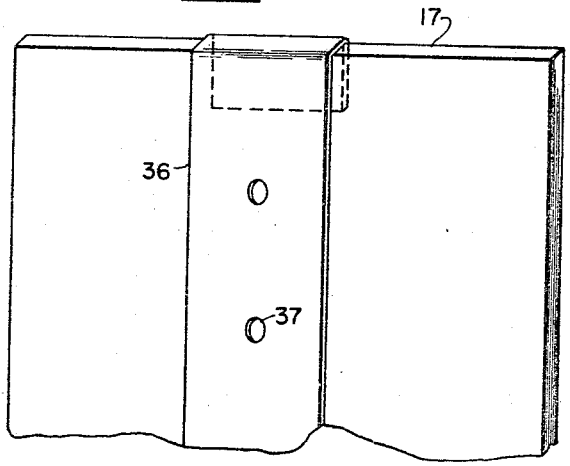
FIGURES 10 and 11 are perspective views of two types of supporting devices for attachment to a panel member to secure displays thereto.

Referring to FIGURE 1 a pair of metallic supports indicated generally at 15 and 16 hold a panel 17 in vertical position. As best shown in FIGURES 5 and 6 the support 15 comprises a pair of U-shaped channel members 18 and 19 of equal length, having their open channels facing in the same direction, and fixedly connected in spaced parallel relationship by a link 20 adjacent their upper ends, and a similar link 21 near their mid-length and a link 22 at their lower ends. The links 20, 21 and 22 are secured to the connecting webs of the channel members as by welding or riveting or the like since the connections are rigid and permanent. The spacings between the bottom of link 20 and the top of link 21 is preferably a minimum of four feet, and the spacing between the adjoining walls 24 and 25 of the members 18 and 19 is approximately one quarter inch greater than twice the thickness of the panel 17, to provide room for two thicknesses of panel 17 plus a clamping head 32 (FIGURES 7 and 8) which will be described.

The bottoms of the members 18 and 19 are removably secured by bolts 26 to the center of the vertical wall of a right angled horizontal leg member 27 that provides legs to hold the support 15 upright when the complete stand is assembled, the legs being removed to reduce initial shipping space and subsequent storage space requirements when the supports are not being used, as well as to provide a means for assembling several supports 15 or 16 at one point when multiple panel arrangements similar to that shown in FIGURE 3 are desired.

As best shown in FIGURES 5, 6 and 7 the inner wall 24 of channel member 18 has a series of at least three threaded nuts 28 welded to it at intervals, and a machine screw 29 threaded through each, passing through the inner wall, and each having an integral enlarged clamping head 32 on its end in the space between adjoining walls 24 and 25. The front wall 33 of each channel member 18 has three openings 34 therethrough, one in axial alignment with each screw 29 for the passage of a screwdriver to engage a screwdriver slot 35 in the end of each screw 29. The screws 29 with their integral clamping heads are inserted into the nuts 28 before the two channel members are secured together with the links 20, 21, and 22 and the lengths of the screws 29 are such that after assembly of the chanel members the screws cannot be withdrawn, because their clamping heads 32 will engage the wall 25 of channel member 19 while the screws 29 are still in full engagement with the nuts 28.

The other support 16 is identical with the support 15 except that the open ends of its U-shaped channel members face the open ends of the U-shaped channel members 18 and 19 of the first described support 15. Also the right angled members 27 at the lower ends of the supports face each other.

With the supports 15 and 16 constructed as described and with a pair of them facing each other a panel 17 may be supported in FIGURE 1.

The illustrated panel is square in a 4' x 4' size but may be any size up to and include the commercially available length of the paneling material. Where the panel is to be supported above the floor as illustrated in FIGURE 1 for the display of artwork, advertising or bulletin board use, it is necessary that the ends of the panels protrude between the pairs of channel members in each support 15 and 16 and rest upon middle links 21. The positioning of links 21 and the spacing between upper links 20 and links 21 is such as to accommodate the standard commercially available 4' panel width at a height most commonly used for such displays. Where unusual panel widths are involved or where a support height other than that shown is desired for special uses the location of both links 20 and 21 and the spacing between them can be adjusted at the time of manufacture to accommodate the special requirements.

When a screwdriver is inserted through the holes 34 the screws 29 may be tightened to clamp the panel between the clamping heads and the adjoining 25 of the channel members 19. The clamping of the panel 17 at its edges by the two supports 15 and 16, provides a rigid display panel, room divider, or the like. If used as a display panel, articles may be displayed on one or both sides by the use of any desirable supports such as a hanger 36 shown in FIGURE 10, having openings 37 therein for the insertion of standard peg board fixtures.

Figure 11:
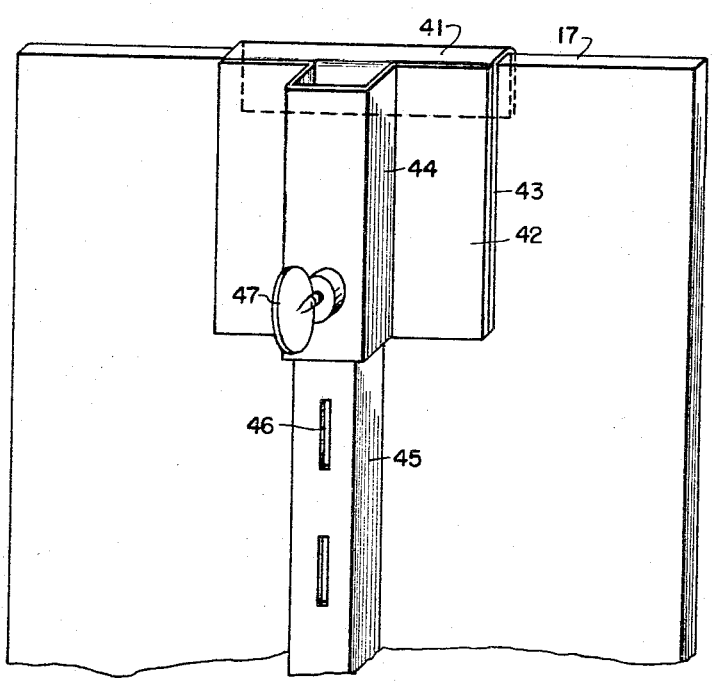

If it is desired to hang shelves upon the panel, as for the display of solid rather than planar objects, the display stand is sufficiently rigid to support shelves or the like. As shown in FIGURE 11, a metal bracket 41 may be hooked over the top edge of the panel. The bracket includes a pair of downwardly depending walls welded together, with the outer wall having rectangular vertical groove 44 for the reception of a conventional slotted chamber member 45 having vertical slots 46 therein for shelf supports that fit into and lock therein, in well known manner. The channel member 45 is clamped to the bracket 41 as by a hand screw 47. As will be understood, two horizontally spaced devices as shown in FIGURE 11 are needed to support one shelf. To assure vertical rigidity of the slotted channel members 45, each should be secured to the bottom of the panel member by a bracket similar to the bracket 41, but inverted so as to engage the bottom edge of panel.

As previously mentioned, the spacing between the adjoining walls 24 and 25 of a support is FIGURE 5 approximately one quarter inch greater than the thickness of two panels 17. With the thickness of the clamping heads 32 on the screws 29 being less than one quarter inch this will permit two panels to be inserted into the space between walls 24 and 25 and then be clamped therein. With this arrangement, another panel of equal thickness to panel 17 may be inserted into the gap between the walls 24 and 25, overlapping the protruding end of the panel 17, and then clamped by the screws 29. The remote end of the additional panel will then be supported by another support similar to either support 15 or 16. Thus three supports will support two panels. Any number of adjoining panels may be supported in this manner.

FIGURE 2 shows how the supports 15 and 16 are adapted to support a larger panel 50, of say 4 x 8 feet with its larger dimension vertical. In this case the panel does not protrude beyond the supports, but has its edges abutting the inner sides of the links 20, 21 and 22 of each support and its lower edge rests upon the floor.

FIGURE 3 illustrates the manner in which two adjoining panels or sets of panels may meet at right angles at a common support. In this case the support 16 is the same as support 16 of FIGURE 1, and support 15 is the same as support 15 of FIGURE 1, except that in FIGURE 3 the right angled member 51 forming a supporting leg, protrudes only in one direction, to the right as viewed in FIGURE 3, and has a shorter leg 52 extending at right angles to the left, and which is secured to the right angled member 27 of support 16 by the screws 26. At their upper ends the two pairs of channel members, each of which are connected together by their links 20, are secured together at right angles by a metal connecting bracket indicated generally in FIGURE 9 at 53. The bracket 53 shown is formed of metal to have two deep U-shaped grips 57 and 58 connected by a right angled common wall 59. The grips 57 and 58 each slip over a link 20 and the bottom wall of adjoining U-shaped channel members 18 and 19 and are normally frictionally held in place, but may be secured by screws passing through the grips 57 and 58 if desired.

FIGURE 3 also shows each vertical panel being made up of coplanar upper and lower panels 60 and 61, and FIGURE 4 shows a clip 62 which is H-shaped in cross-section and embraces the facing edges of the upper and lower panels to hold them in alignment.

It is apparent that instead of the U-shaped channel members 18 and 19 shown and described, two sided angle members could be used instead, thus eliminating the front walls 33 (FIGURE 7) which have the openings 34 for screwdriver access to the screws 29. This would reduce the strength of the supports slightly. Also, members that are T-shaped or tubular in cross-section may be used.

FIGURE 8 illustrates another mounting for the screws 29 which clamp the panels. In this case an elongated nut 64 is welded to the front wall 33 of the cannel member 18, in alignment with each of the openings 34. As in the embodiment of FIGURE 7, the screw 29 in FIGURE 8 is of sufficient length that it remains threaded in the nut 64 even when the clamping head 32 engages the adjoining wall 25, so that it cannot be lost after assembly.

The embodiment of FIGURE 8 offers an advantage over that of FIGURE 7 in that when channel members are used, having the front walls 33, in the construction of the supports, a screwdriver inserted into one of the openings 34 in walls 33 will be guided directly to engagement with the end of the screw 29 and the screwdriver slot therein.

FIGURE 12 shows an embodiment of one of the supports 15 or 16 wherein the U-shaped channel members 67 and 68 have their central webs 69 and 70 facing outwardly and away from each other rather than facing the connecting links 20, 21 and 22 as in the previously described forms. The clamping head 32 is mounted similarly to the one shown in FIGURE 8. The channel member 68 has its open end facing the three clamping heads 32 and in order to provide abutments opposite the clamping heads a U-shaped channel member 71 is fitted within the legs of U-shaped member 68 opposite each of the clamping heads and secured in place as by spot welding or the like.

The links 20, 21 and 22 may be secured to the channel members 67 and 68 by welding or riveting. If rivets are used they preferably extend through both webs of each channel member and have spacer washers 72 such as shown in FIGURE 12 on the rivets 73 between the legs of the channel members.

FIGURE 14 shows a pair of supports 15 and 16 rigidly connected at their bottom end portions by a horizontal stabilizer bar 76 which may be box shaped in cross-section and has a pair of spaced upwardly angled members 77 and 78 which are removably secured as by bolts or the like (not shown) to the lower end portions of the structural elements forming the supports 15 and 16. As shown in FIGURE 14 the angled members 77 and 78 are secured to the supports 15 and 16 at points above the stops of the horizontal leg members 27. When a panel such as 17 is secured between the supports 15 and 16 in the manner previously described, the stabilizer bar adds a degree of rigidity to the assembly. If a panel is not used between the supports the stabilizer 76 holds them rigidly in upright parallel position and a connecting curtain rod or the like can be assembled with the upright supports and a cloth drape stretched across its top to make a suitable backdrop for some exhibit purposes.

Some paneling material is so flexible that when mounted in the supports 15 and 16 in the manner described it can bend about a vertical axis. FIGURES 15 and 16 illustrate in cross-section two forms of edge stiffeners that may be clamped to the top and bottom edges of a panel to prevent such bending. In each of these figures, the stiffener is shown in sections and a portion of the upper part of a panel 17 is shown in dot-dash lines.

The stiffener 80 of FIGURE 16 has three vertical legs 81, 82 and 83 connected by horizontal legs 84 and 85. An elongated nut 86 is welded to the leg 81 in alignment with a screwdriver hole 87 therethrough, and a screw 88 having a clamping head 89 on its outer end passes through an opening in the stiffener wall 82 and is threaded into the nut 86. The right end of the screw 88 has a screwdriver slot for engagement by a screwdriver inserted through the opening 87 in the leg 81. The panel 17 is clamped along its upper edge between the stiffener leg 83 and each clamping head 89, there being a series of such clamping heads 32 spaced along the length of the stiffener 80 at regular intervals which should not be more than about two feet. The stiffener 80 of FIGURE 16 presents a projecting frame along the upper and lower edges of a panel when viewed from the right of the figure, and on the other side it presents a surface virtually flush with that of the panel 17.

The stiffener 90 of FIGURE 15 is similar in all respects to the stiffener 80 of FIGURE 16 except that it has an additional vertical leg 91 connected by a horizontal leg 92 to the vertical leg 93 which corresponds to the leg 83 of FIGURE 16. Thus the stiffener 90 of FIGURE 15 presents a projecting frame along the upper and lower edges of a panel when viewed from either side of the figure.

FIGURE 17 shows another form of hanger for a display such as a picture frame. It comprises a square rod 95 secured at its upper end to a member 96 having a hook 97 by which it is hooked over the top edge of a panel 17, shown in dot-dash lines. An adjustable slide 98 having a bore to mate the rod 95 is adjustably mounted on the rod, being secured thereto in any selected position by a clamping screw 99. The slide has a hook 102 over which may be hooked the wire of a picture frame.

The hanger of FIGURE 17 is designed so it may be used in pairs, where the picture or the like is large or heavy. For this reason the adjustable slide 98 has protrusions or bosses 103 and 104 on its opposite sides having vertical openings therethrough, the opening in boss 103 being indicated at 105. Boss 104 has an identical opening into which is inserted a vertical leg 106 of a horizontal spreader bar 107. At its other end the spreader bar has a similar vertical leg which is inserted into an opening 105 in a similar adjustable slide on a spaced rod similar to rod 95. When two such rods 95 and their adjustable slides 98 are used the spreader bar 107 prevents their lower ends being drawn together due to the weight of the picture or the like. The rods 95 may be separated by any distance and the spreader bar 107 may be of fixed length to suit the separation, or may be made adjustable in length in any suitable manner.

FIGURE 18 shows another form of hanger for display of a card or the like by mounting it upon one or more rods 110 which may be similar to the square rod 95 of FIGURE 17 and hooked over the top edge of a panel in a similar manner. A pair of slides 111 and 112 slidably mounted on the rod 110 and clamped thereto by clamping screws 113 and 114. The two slides are identical but are reversed in position on the rod so that grooves or slots 115 and 116 face each other to clamp the upper and lower edges of a card or the like therebetween. For horizontally long cards a plurality of hangers such as shown in FIGURE 18 may be used to support the card.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a device for holding a vertical panel for use as a display mounting or room divider:
   (a) a support comprising first and second elongated spaced planar members rigidly connected together solely at one pair of their adjacent edges;

(b) a nut, elongated in the direction of its threads, affixed to the first of said planar members with its axis at right angles thereto;

(c) a machine screw threaded in said nut, having at one end an enlarged clamping head between said planar members, the other end of said screw normally terminating within said nut and having tool engageable means at said other end;

(d) said first planar member to which said nut is affixed being provided with an opening in alignment with said screw for insertion of a tool for engagement with said screw;

(e) the spacing between said parallel members being sufficient to loosely receive at least one panel member between the second of said planar members and the enlarged head on said clamping screw; and (f) a horizontal leg member extending at right angles to but substantially coplanar with, and rigidly secured to the bottom end portions of said parallel planar members.

2. In combination with the device of claim 1:
(a) a second support similar to that of claim 1, spaced to and parallel thereto; and
(b) a rigid planar panel extending between said supports and secured between said clamping heads on said machine screws and the second planar member of each support.

3. In the device of claim 2,
(a) a pair of longitudinally spaced display hangers each including a vertical member hooked over the top edge of said panel;
(b) a slide member mounted upon each of said vertical members and each having a hook for mounting a display;
(c) means for adjustably securing each of said slide members along the length of its respective vertical member; and
(d) a spreader bar rigidly connecting said slide members to prevent the lower ends of said vertical members from being drawn together due to the weight of a picture or the like hung on the hooks on said slide members.

4. In the device of claim 2;
(a) a display hanger hooked over the top edge of said panel;
(b) an upper slide member slidably mounted upon said hanger and having a downwardly facing slot for engaging the upper edge of a display card; and
(c) a lower slide member slidably mounted upon said hanger and having an upwardly facing slot for engaging the lower edge of a display card;
(d) at least said lower slide member having means thereon for securing it to said hanger to prevent sliding movement thereon.

5. In combination with the device of claim 1:
(a) a second support similar to that of claim 1; and
(b) said second support being fixedly joined to the support of claim 1 at an angle thereto but parallel therewith.

6. In the device of claim 5:
(a) a connecting bracket embracing adjoining portions of each member at the tops thereof, to secure said supports together at the tops thereof.

7. In the device of claim 5:
(a) means affixing the horizontal leg member of said second support substantially to the mid-point of the leg member of the support of claim 1.

8. In combination with the device of claim 1:
(a) a second support similar to that of claim 1, spaced therefrom and parallel thereto;
(b) a planar panel extending between said supports and secured between said clamping heads on said machine screws and said second planar members of each support; and
(c) stiffener members removably secured solely to the upper and lower edges of said panel to prevent it from bending about a vertical axis.

9. The device of claim 8 wherein said stiffener members are channel shaped in cross-section with the connecting webs engaging the outer edges of the panel; and
(a) screw clamps between the legs of the stiffener members for clamping them to the panel.

10. In the device of claim 1,
(a) the length of said machine screw being sufficiently long that it will remain threaded in said nut if said enlarged clamping head is in engagement with the second of said planar members.

11. In a device for holding a vertical panel for use as a display mounting or room divider:
(a) a support comprising first and second spaced parallel U-shaped channel members each having spaced parallel first and second walls and connecting web members;
(b) a first wall of said first channel member being spaced from, parallel to and facing a second wall of said second channel member;
(c) said connecting web members being substantially coplanar;
(d) connecting links rigidly securing said pairs of channel members together;
(e) a machine screw threaded through said first wall of said first channel member;
(f) a clamping head on said machine screw between said first wall of said first channel member and said second wall of said second channel member;
(g) the length of said machine screw being sufficiently long that it will remain threaded in said first wall of said first channel member if said clamping head is in engagement with said second wall of said second channel member; and
(h) a horizontal leg member extending at right angles to but substantially coplanar with and rigidly secured to the bottom end portions of said parallel angled members.

12. In the device of claim 11, the second wall of said first channel member having an opening therethrough in axial alignment with said machine screw for the passage of a tool to engage said machine screw.

13. In a device for holding a vertical panel for use as a display mounting or room divider:
(a) a support comprising first and second spaced parallel U-shaped channel members each having spaced parallel first and second walls and connecting web members;
(b) a first wall of said first channel member being spaced from, parallel to and facing a second wall of said second channel member;
(c) said connecting web members being substantially coplanar;
(d) connecting links rigidly securing said pairs of channel members together;
(e) a machine screw passing through one of said walls of said first channel member and extending into the space between said first wall of said first channel member and said second wall of said second channel member;
(f) a nut secured to one of said walls of said first channel member;
(g) said screw being threaded in said nut;
(h) a clamping head on said machine screw between said first wall of said first channel member and said second wall of said second channel member;
(i) the length of said machine screw being sufficiently long that it will remain threaded in said nut if said clamping head is in engagement with said second wall of said second channel member; and
(j) a horizontal member extending at right angles to but substantially coplanar with and rigidly secured to the bottom end portions of said parallel angled members.

14. The device of claim 13, said nut being secured to the inner surface of the second wall of said first channel member.

References Cited

UNITED STATES PATENTS

| | | | |
|---|---|---|---|
| 1,858,152 | 5/1932 | Hallowell | 40—125 |
| 1,896,769 | 2/1933 | Davis | 52—484 X |
| 2,552,745 | 5/1951 | Stanley | 40—125 |
| 2,586,636 | 2/1952 | Fischer | 248—316 X |
| 3,188,028 | 6/1965 | Waller | 248—316 X |

FOREIGN PATENTS

| | | |
|---|---|---|
| 1,172,974 | 6/1964 | Germany. |
| 885,372 | 12/1961 | Great Britain. |

FRANK L. ABBOTT, *Primary Examiner.*

G. W. HORNADAY, A. C. PERHAM, *Assistant Examiners.*